United States Patent [19]

Gustison

[11] 4,003,755
[45] Jan. 18, 1977

[54] DISPERSION-HARDENED LEAD ALLOY

[76] Inventor: Robert Lawrence Gustison, 2982 Wilson School Lane, Sinking Spring, Pa. 19608

[22] Filed: Aug. 22, 1975

[21] Appl. No.: 606,966

[52] U.S. Cl. .............................. 429/178; 75/134 S; 75/166 R; 75/201; 429/226; 429/245
[51] Int. Cl.² ..................... H01M 2/28; C22C 11/00
[58] Field of Search ............. 75/166 R, 134 S, 201; 136/65, 26; 29/182.5

[56] References Cited

UNITED STATES PATENTS 3,310,438  3/1967  Huffman et al. ................ 75/166 R

OTHER PUBLICATIONS

R. P. Elliot, "Constitution of Binary Alloys, First Supplement," pp. 722–723, N.Y., McGraw-Hill, 1965.

*Primary Examiner*—L. Dewayne Rutledge
*Assistant Examiner*—E. L. Weise
*Attorney, Agent, or Firm*—Synnestvedt & Lechner

[57] ABSTRACT

A lead alloy is prepared by dispersing minor amounts by weight of silicon in a continuous lead phase. The alloy has a lesser density than unalloyed lead and has improved strength, excellent corrosion resistance, good electrical conductivity, and satisfactory workability.

11 Claims, No Drawings

DISPERSION-HARDENED LEAD ALLOY

STATE OF THE PRIOR ART

The use of pure lead is limited in some applications due to its softness and lack of structural rigidity. For this reason, it is common to alloy lead with other materials, such as antimony, in order to obtain an increase in hardness. In many of these applications, as best typified by battery posts and grids for battery plates, it is also a requirement that the alloy have good electrical conductivity and good chemical resistance in the dilute to moderately concentrated sulfuric acid environment of lead-acid battery cells. For purposes of clarity of description, the invention is discussed below primarily with regard to battery applications, although it is to be understood that the invention is not intended to be so limited.

The most common alloying material for lead for use in making battery elements is antimony. For example, a typical 100 hour ampere hour lead-acid storage battery may contain about ten pounds of a lead alloy, containing about 9 wt. % antimony, in its positive and negative grid structures that supply the frames for the active plate materials. Antimony is desirable in that it materially increases the hardness of the lead and also it has an electrical resistivity not materially greater than lead. However, it suffers from the disadvantage that it is fairly rare and is a moderately expensive material. More objectionably, antimony is not as resistant to attack by battery acid as is lead and, when it is used, the self-discharge rate of the battery is increased and the service life of the battery is decreased due to the greater build-up of corrosion sludge deposits in the battery. Thus, while antimony does provide the function of hardening the lead, its lesser resistance to attack by battery acid reduces both the efficiency and the life of the battery.

Antimony is also somewhat objectionable due to its high density of about 6.7. While this density is only about 60% that of lead, nonetheless it does make a material contribution to the over-all weight of battery elements.

Other materials have been proposed as an alloying agent for lead and one currently receiving attention is calcium. Calcium is expensive and is readily oxidized, making the production of an alloy based upon calcium a difficult and expensive process.

SUMMARY OF THE INVENTION

Accordingly, it is the object of this invention to provide a new alloy of lead which will be significantly harder than lead, that will have a significantly lesser density than lead, that will not detract from the corrosion resistance of lead, and, at the same time, will not appreciably diminish the electrical conductivity of lead.

The above object of this invention is achieved by incorporating finely divided silicon in a continuous phase of lead. It has been found that the inclusion of comparatively minor amounts of silicon, e.g. as little as 5 wt.%, will materially increase the hardness of lead. It has also been found that this alloy has substantially the same resistance to attack by battery acid as does pure lead. As a further advantage, the comparatively low density of silicon (only about 21% that of lead) will result in a significant reduction in the weight of battery components. Silicon has only a slightly higher electrical resistivity than does antimony, and thus, as an alloying agent, does not greatly increase the resistivity over that of an antimony-lead alloy. Lastly, silicon is, of course, readily available and inexpensive.

DETAILED DESCRIPTION OF THE INVENTION

Silicon is alloyed with lead in the practice of this invention in a manner in which a physical mixture, as opposed to a solid solution, is obtained. In other words, the silicon is present in the alloy in the form of discrete particles held in a continuous matrix of lead. This result may be achieved in several different ways, the simplest of these being to blend together a mixture of lead and silicon powders which have been comminuted to approximately minus 80 mesh (Tyler series). This mixture is compacted to form a rigid, self-sustaining shape. The compact, as so formed, is rather brittle, but when heat-treated, as by sintering the compact at temperatures in a range of from about 150° C to about 300° C, the compact becomes ductile, but is nonetheless appreciably harder than is a compact formed from pure lead under the same conditions. A silicon-lead compact of this type, when immersed in 10% sulfuric acid, has been found to be as chemically resistant as pure lead, and its electrical resistivity only somewhat reduced.

Another technique that may be utilized to form the lead-silicon alloy of this invention is to add finely divided silicon to molten lead and cast the slurry in a suitable mold while the silicon is uniformly dispersed throughout the melted lead.

The amount of silicon added to the lead is not critical and the percentage will be selected by balancing, for each application, the desired physical properties such as hardness, density and electrical conductivity. While the limitations are not, as mentioned, critical, it is believed that a range of from between about 5 wt.% to about 35 wt.% silicon encompasses most of the useful range, and, more particularly, for applications such as grids for battery plates, about 10 wt.% to about 25 wt.% of silicon is a preferred range.

EXAMPLES 1–6

A series of six mixtures of minus 100 mesh lead and silicon powders were thoroughly mixed and pressed in a mechanical press at 10,000 lbs/sq.in. pressure. These compacts were then sintered for two hours at 200° C. The physical properties of the compacts were measured and were as listed in the table below. As can be seen from the data given in the table, the silicon concentration was varied from between 0 to 25 wt.% (0 to 62 vol.%). The density of the alloys was reduced appreciably as compared to lead, the electrical resistivity was slightly increased, and the Brinell hardness tripled over the range of silicon concentrations used. ⅜-inch thick compacts of the alloys could be rolled to strips 1/16 inch thick, and are amenable to rolling, swaging, extrusion, drawing, and other forming techniques.

By way of comparison, it is noted that the density of the alloy of Example 2 was 8.18 g/cc. If the same volume percentage of antimony were used in preparing the lead alloy, the density would be 9.71 g/cc. Thus, on a 10 vol.% basis, a silicon-lead alloy will be about 16% less dense than its antimony-lead counterpart. Similarly, with the 46% volume inclusion of Example 3, the use of silicon will reduce the density of a comparative alloy made with antimony by about 22%.

| Example | Si wt.% | Si vol.% | Density g/cc | Resistivity ohms | Hardness BHN* |
|---------|---------|----------|--------------|------------------|---------------|
| 1 | 0 | 0 | 11.34 | 1.1 | 10.6 |
| 2 | 10 | 35 | 8.18 | 1.73 | 20.4 |
| 3 | 15 | 46 | 7.19 | 1.93 | 25.0 |
| 4 | 17 | 50 | 6.85 | 1.99 | 27.0 |
| 5 | 20 | 55 | 6.39 | 2.09 | 30.0 |
| 6 | 25 | 62 | 5.77 | 2.22 | 32.0 |

*Brinell hardness with 300 Kg load, 10 mm ball

I claim:

1. A lead alloy comprised of from about 5% to about 35% by weight of finely divided silicon dispersed in a continuous phase of lead.

2. An alloy according to claim 1 wherein the silicon is present in an amount of from about 10 to about 25 wt.%.

3. An alloy according to claim 1 wherein the silicon is minus 80 mesh (Tyler series).

4. A method of preparing the alloy of claim 1 which comprises mixing finely divided lead and silicon powders and mechanically compacting the mixture under sufficient pressure to yield a form-stable article.

5. A method according to claim 4 in which the finely divided silicon and lead are both minus 80 mesh.

6. A method according to claim 4 wherein the compacting pressure is in excess of 1,000 lbs/sq.in.

7. A method according to claim 4 wherein the compacted mixture of powders is sintered at temperatures between about 150° C and about 300° C.

8. A method for producing the alloy of claim 1 wherein the finely divided silicon is dispersed in molten lead and the dispersion is solidified.

9. An improved lead-acid battery in which the metallic lead used to form at least some of the components of the battery is in the form of a dispersion-hardened alloy of lead and a minor but significant hardness-modifying amount of minus 80 mesh silicon.

10. A battery according to claim 9 in which the alloy is used to form grids for the battery plates.

11. A battery according to claim 10 in which the alloy is used to form the battery posts.

* * * * *